(12) United States Patent
Lu et al.

(10) Patent No.: US 12,482,453 B2
(45) Date of Patent: Nov. 25, 2025

(54) TRAINING FOR LONG-FORM SPEECH RECOGNITION

(71) Applicant: Google LLC, Mountain View, CA (US)

(72) Inventors: Zhiyun Lu, Brooklyn, NY (US);
Thibault Doutre, Mountain View, CA (US); Yanwei Pan, Mountain View, CA (US); Liangliang Cao, Mountain View, CA (US); Rohit Prabhavalkar, Mountain View, CA (US); Trevor Strohman, Mountain View, CA (US); Chao Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 466 days.

(21) Appl. No.: 17/935,924

(22) Filed: Sep. 27, 2022

(65) Prior Publication Data

US 2023/0103382 A1 Apr. 6, 2023

Related U.S. Application Data

(60) Provisional application No. 63/262,137, filed on Oct. 5, 2021.

(51) Int. Cl.
*G10L 15/06* (2013.01)
*G10L 15/04* (2013.01)
(Continued)

(52) U.S. Cl.
CPC ............ *G10L 15/063* (2013.01); *G10L 15/04* (2013.01); *G10L 15/06* (2013.01); *G10L 15/16* (2013.01);
(Continued)

(58) Field of Classification Search
None
See application file for complete search history.

(56) References Cited

U.S. PATENT DOCUMENTS

| 5,727,124 A | * | 3/1998 | Lee | ........................ | G10L 15/065 |
| | | | | | 704/E15.009 |
| 10,147,428 B1 | * | 12/2018 | Shastry | ................ | H04N 19/172 |

(Continued)

FOREIGN PATENT DOCUMENTS

| JP | 2020537765 A | 12/2020 |
| WO | 2022203701 A1 | 9/2022 |

OTHER PUBLICATIONS

International Search Opinion for PCT/US2022/077124. (Year: 2023).*
(Continued)

*Primary Examiner* — Richard Z Zhu
(74) *Attorney, Agent, or Firm* — Honigman LLP; Brett A. Krueger; Grant Griffith

(57) ABSTRACT

A method includes obtaining a set of training samples, wherein each training sample includes a corresponding sequence of speech segments corresponding to a training utterance and a corresponding sequence of ground-truth transcriptions for the sequence of speech segments, and wherein each ground-truth transcription includes a start time and an end time of a corresponding speech segment. For each training sample in the set of training samples, the method includes processing, using a speech recognition model, the corresponding sequence of speech segments to obtain one or more speech recognition hypotheses for the training utterance; and, for each speech recognition hypothesis obtained for the training utterance, identifying a respective number of word errors relative to the corresponding sequence of ground-truth transcriptions. The method trains the speech recognition model to minimize word error rate based on the respective number of word errors identified for each speech recognition hypothesis obtained for the training utterance.

14 Claims, 9 Drawing Sheets

(51) Int. Cl.
  *G10L 15/16* (2006.01)
  *G10L 15/197* (2013.01)
  *G10L 15/22* (2006.01)
  *G10L 15/07* (2013.01)
  *G10L 15/18* (2013.01)

(52) U.S. Cl.
  CPC ............ *G10L 15/197* (2013.01); *G10L 15/22* (2013.01); *G10L 2015/0636* (2013.01); *G10L 15/075* (2013.01); *G10L 15/1815* (2013.01)

(56) References Cited

U.S. PATENT DOCUMENTS

| | | | |
|---|---|---|---|
| 10,176,799 B2* | 1/2019 | Hori | G06N 3/044 |
| 10,593,321 B2* | 3/2020 | Watanabe | G10L 15/063 |
| 11,107,463 B2* | 8/2021 | Prabhavalkar | G10L 15/16 |
| 11,562,734 B2* | 1/2023 | Ren | G10L 25/30 |
| 11,587,569 B2* | 2/2023 | Ye | G10L 25/30 |
| 11,657,799 B2* | 5/2023 | Zhao | G06N 3/044 704/232 |
| 11,727,920 B2* | 8/2023 | Botros | G06N 3/044 704/232 |
| 11,922,963 B2* | 3/2024 | Wang | G10L 25/30 |
| 2009/0299744 A1* | 12/2009 | Tachimori | G10L 15/063 704/250 |
| 2019/0385610 A1* | 12/2019 | Steelberg | G10L 25/90 |
| 2020/0043483 A1* | 2/2020 | Prabhavalkar | G10L 15/16 |
| 2020/0286485 A1* | 9/2020 | Steelberg | G10L 15/063 |
| 2021/0183373 A1* | 6/2021 | Moritz | G06N 3/045 |
| 2021/0225369 A1 | 7/2021 | Hu et al. | |
| 2022/0310071 A1* | 9/2022 | Botros | G06N 3/044 |
| 2022/0351718 A1* | 11/2022 | Wu | G06N 3/08 |
| 2023/0096821 A1* | 3/2023 | Huang | G10L 15/197 704/235 |
| 2023/0169954 A1* | 6/2023 | Thomas | G10L 15/16 704/200 |

OTHER PUBLICATIONS

He et al., "Streaming End-to-End Speech Recognition for Mobile Devices", ICASSP 2019, pp. 6381-6385 (Year: 2019).*
Jun Ogata et al., "The use of acoustically detected filled and silent pauses in spontaneous speech recognition", ICASSP, 2009, pp. 4305-4308. (Year: 2009).*
International Search Report and Written Opinion for the related Application No. PCT/US2022/077124, dated Feb. 14, 2023, 18 pages.
Prabhavalkar Rohit et al: "Minimum Word Error Rate Training for Attention-Based Sequence-to-Sequence Models", 2018 IEEE International Conference on Acoustics, Speech and Signal Processing (ICASSP), IEEE, Apr. 15, 2018 (Apr. 15, 2018), pp. 4839-4843, XP033401086, DOI: 10.1109/ICASSP.2018.8461809, section 3.1, section 3.2, section 4, 5 pages.
Tara N Sainath et al: "Two-Pass End-to-End Speech Recognition", arxiv.org, Cornell University Library, 201 Olin Library Cornell University Ithaca, NY 14853, Aug. 29, 2019 (Aug. 29, 2019), XP081489070, section 3, figure 1, 5 pages.
Hu Ke et al: "Deliberation Model Based Two-Pass End-To-End Speech Recognition", ICASSP 2020—2020 IEEE International Conference on Acoustics, Speech and Signal Processing (ICASSP), IEEE, May 4, 2020 (May 4, 2020), pp. 7799-7803, XP033793266, DOI: 10.1109/ICASSP40776.2020.9053606, figure 1, section 2, 5 pages.
Japanese Office Action for the related Application No. 2024-520752 dated Jul. 1, 2025.
Jun Ogata et al: "Improvements of Spontaneous Speech Recognition by Using Decoding Based on Automatic Filled and Silent Pause Detection", (Feb. 1, 2009), D-Abstracts of IEICE Transactions on Information and Systems (Japanese Edition) vol. J92-D No. 2 pp. 226-235.

\* cited by examiner

TRAINING FOR LONG-FORM SPEECH RECOGNITION

CROSS REFERENCE TO RELATED APPLICATIONS

This U.S. Patent application claims priority under 35 U.S.C. § 119(e) to U.S. Provisional Application 63/262,137, filed on Oct. 5, 2021. The disclosure of this prior application is considered part of the disclosure of this application and is hereby incorporated herein by reference in its entirety.

TECHNICAL FIELD

This disclosure relates to training a speech recognition model for long-form speech recognition.

BACKGROUND

Modern automatic speech recognition (ASR) systems focus on providing not only high quality (e.g., a low word error rate), but also low latency (e.g., a short delay between the user speaking and a transcription appearing) speech recognition for spoken utterances. For example, when using a device that implements an ASR system, there is often an expectation that the ASR system decodes utterances in a streaming fashion that corresponds to real-time or even faster than real-time.

SUMMARY

One aspect of the disclosure provides a computer-implemented method for training a speech recognition model to recognize long-form speech. The computer-implemented method when executed on data processing hardware causes the data processing hardware to perform operations including obtaining a set of training samples. Each training sample in the set of training samples includes a corresponding sequence of speech segments corresponding to a training utterance and a corresponding sequence of ground-truth transcriptions for the sequence of speech segments. Each ground-truth transcription in the corresponding sequence of ground-truth transcriptions including a start time and an end time of a corresponding speech segment. For each training sample in the set of training samples, the method includes processing, using the speech recognition model, the corresponding sequence of speech segments to obtain one or more speech recognition hypotheses for the training utterance; for each speech recognition hypothesis obtained for the training utterance, identifying a respective number of word errors relative to the corresponding sequence of ground-truth transcriptions; and training the speech recognition model to minimize word error rate based on the respective number of word errors identified for each speech recognition hypothesis obtained for the training utterance.

Implementations of the disclosure may include one or more of the following optional features. In some implementations, processing the sequence of speech segments to obtain one or more speech recognition hypotheses includes processing the sequence of speech segments to obtain an N-best list of speech recognition hypotheses; and training the speech recognition model to minimize word error rate includes training the speech recognition model to minimize word error rate based on an average of the respective number of word errors identified for each speech recognition hypothesis in the N-best list of speech recognition hypotheses.

In some examples, each training sample in the set of training samples further includes a respective non-speech segment between each pair of adjacent speech segments in the sequence of speech segments. In some implementations, each speech segment in the sequence of speech segments has an average duration of at least six seconds.

In some implementations, the speech recognition model includes a transducer-based speech recognition model that has an encoder network, a prediction network, and a joint network. In some examples, the encoder network includes a plurality of multi-headed attention layers.

In some examples, the prediction network is configured to, at each of a plurality of time steps subsequent to an initial time step receive, as input, a sequence of non-blank symbols output by a final softmax layer. At each of the plurality of time steps and for each non-blank symbol in the sequence of non-blank symbols received as input at the corresponding time step, the prediction network is configured to generate, using a shared embedding matrix, an embedding of the corresponding non-blank symbol; assign a respective position vector to the corresponding non-blank symbol; and weight the embedding proportional to a similarity between the embedding and the respective position vector. The prediction network is further configured to generate, as output, a single embedding vector at the corresponding time step, the single embedding vector based on a weighted average of the weighted embeddings. In some implementations the joint network is configured to, at each of the plurality of time steps subsequent to the initial time step: receive, as input, the single embedding vector generated as output from the prediction network at the corresponding time step; and generate a probability distribution over possible speech recognition hypotheses at the corresponding time step. In some examples, the prediction network ties a dimensionality of the shared embedding matrix to a dimensionality of an output layer of the joint network.

Another aspect of the disclosure provides a system including data processing hardware, and memory hardware in communication with the data processing hardware and storing instructions that when executed on the data processing hardware causes the data processing hardware to perform operations. The operations include obtaining a set of training samples. Each training sample in the set of training samples includes a corresponding sequence of speech segments corresponding to a training utterance and a corresponding sequence of ground-truth transcriptions for the sequence of speech segments. Each ground-truth transcription in the corresponding sequence of ground-truth transcriptions including a start time and an end time of a corresponding speech segment. For each training sample in the set of training samples, the operations include processing, using the speech recognition model, the corresponding sequence of speech segments to obtain one or more speech recognition hypotheses for the training utterance; for each speech recognition hypothesis obtained for the training utterance, identifying a respective number of word errors relative to the corresponding sequence of ground-truth transcriptions; and training the speech recognition model to minimize word error rate based on the respective number of word errors identified for each speech recognition hypothesis obtained for the training utterance.

Implementations of the disclosure may include one or more of the following optional features. In some implementations, processing the sequence of speech segments to obtain one or more speech recognition hypotheses includes processing the sequence of speech segments to obtain an N-best list of speech recognition hypotheses; and training the speech recognition model to minimize word error rate includes training the speech recognition model to minimize word error rate based on an average of the respective number of word errors identified for each speech recognition hypothesis in the N-best list of speech recognition hypotheses.

In some examples, each training sample in the set of training samples further includes a respective non-speech segment between each pair of adjacent speech segments in the sequence of speech segments. In some implementations, each speech segment in the sequence of speech segments has an average duration of at least six seconds.

In some implementations, the speech recognition model includes a transducer-based speech recognition model that has an encoder network, a prediction network, and a joint network. In some examples, the encoder network includes a plurality of multi-headed attention layers.

In some examples, the prediction network is configured to, at each of a plurality of time steps subsequent to an initial time step receive, as input, a sequence of non-blank symbols output by a final softmax layer. At each of the plurality of time steps and for each non-blank symbol in the sequence of non-blank symbols received as input at the corresponding time step, the prediction network is configured to generate, using a shared embedding matrix, an embedding of the corresponding non-blank symbol; assign a respective position vector to the corresponding non-blank symbol; and weight the embedding proportional to a similarity between the embedding and the respective position vector. The prediction network is further configured to generate, as output, a single embedding vector at the corresponding time step, the single embedding vector based on a weighted average of the weighted embeddings. In some implementations the joint network is configured to, at each of the plurality of time steps subsequent to the initial time step: receive, as input, the single embedding vector generated as output from the prediction network at the corresponding time step; and generate a probability distribution over possible speech recognition hypotheses at the corresponding time step. in some examples, the prediction network ties a dimensionality of the shared embedding matrix to a dimensionality of an output layer of the joint network.

Yet another aspect of the disclosure provides a computer-implemented method for training a speech recognition model to recognize long-form speech. The method includes obtaining a set of training samples. Each training sample in the set of training samples including a corresponding sequence of raw speech segments and a corresponding sequence of ground-truth transcriptions for the sequence of raw speech segments. Each ground-truth transcription in the corresponding sequence of ground-truth transcriptions including a start time and an end time of a corresponding raw speech segment. The method includes concatenating two or more groups of consecutive raw speech segments from the sequence of raw speech segments to form a respective long training utterance for each concatenated group of consecutive raw speech segments. During a first training stage, for each respective long training utterance, the method includes: processing, using the speech recognition model, the concatenated group of consecutive raw speech segments to predict a speech recognition hypothesis for the respective long training utterance; and training the speech recognition model using a log loss based on the predicted speech recognition hypothesis for the respective long training utterance and a corresponding group of ground-truth transcriptions.

Implementations of the disclosure may include one or more of the following optional features. In some implementations, the method further includes, during a second training stage, for each training sample in the set of training samples: processing, using the speech recognition model initialized by the first training stage, the corresponding sequence of raw speech segments to obtain one or more speech recognition hypotheses; for each speech recognition hypothesis, identifying a respective number of word errors relative to the corresponding sequence of ground-truth transcriptions; and training the speech recognition model to minimize word error rate based on the respective number of word errors identified for each speech recognition hypothesis.

In some examples, processing the sequence of raw speech segments to obtain one or more speech recognition hypotheses includes processing the sequence of raw speech segments to obtain an N-best list of speech recognition hypotheses; and training the speech recognition model to minimize word error rate includes training the speech recognition model to minimize word error rate based on an average of the respective number of word errors identified for each speech recognition hypothesis in the N-best list of speech recognition hypotheses.

In some implementations, the speech recognition model includes a transducer-based speech recognition model that includes an encoder network and a decoder. Here, the decoder includes a prediction network, and a joint network. In some examples, training the speech recognition model to minimize word error rate during the second training stage includes fine-tuning parameters of the decoder initialized by the first training stage without fine-tuning any parameters of the encoder network initialized by the first training stage.

Still another aspect of the disclosure provides a system including data processing hardware, and memory hardware in communication with the data processing hardware and storing instructions that when executed on the data processing hardware causes the data processing hardware to perform operations. The operations include obtaining a set of training samples. Each training sample in the set of training samples including a corresponding sequence of raw speech segments and a corresponding sequence of ground-truth transcriptions for the sequence of raw speech segments. Each ground-truth transcription in the corresponding sequence of ground-truth transcriptions including a start time and an end time of a corresponding raw speech segment. The operations include concatenating two or more groups of consecutive raw speech segments from the sequence of raw speech segments to form a respective long training utterance for each concatenated group of consecutive raw speech segments. During a first training stage, for each respective long training utterance, the operations include: processing, using the speech recognition model, the concatenated group of consecutive raw speech segments to predict a speech recognition hypothesis for the respective long training utterance; and training the speech recognition model using a log loss based on the predicted speech recognition hypothesis for the respective long training utterance and a corresponding group of ground-truth transcriptions.

Implementations of the disclosure may include one or more of the following optional features. In some implementations, the operations further include, during a second training stage, for each training sample in the set of training samples: processing, using the speech recognition model initialized by the first training stage, the corresponding sequence of raw speech segments to obtain one or more speech recognition hypotheses; for each speech recognition hypothesis, identifying a respective number of word errors relative to the corresponding sequence of ground-truth transcriptions; and training the speech recognition model to minimize word error rate based on the respective number of word errors identified for each speech recognition hypothesis.

In some examples, processing the sequence of raw speech segments to obtain one or more speech recognition hypotheses includes processing the sequence of raw speech segments to obtain an N-best list of speech recognition hypotheses; and training the speech recognition model to minimize word error rate includes training the speech recognition model to minimize word error rate based on an average of the respective number of word errors identified for each speech recognition hypothesis in the N-best list of speech recognition hypotheses.

In some implementations, the speech recognition model includes a transducer-based speech recognition model that includes an encoder network and a decoder. Here, the decoder includes a prediction network and a joint network. In some examples, training the speech recognition model to minimize word error rate during the second training stage includes fine-tuning parameters of the decoder initialized by the first training stage without fine-tuning any parameters of the encoder network initialized by the first training stage.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
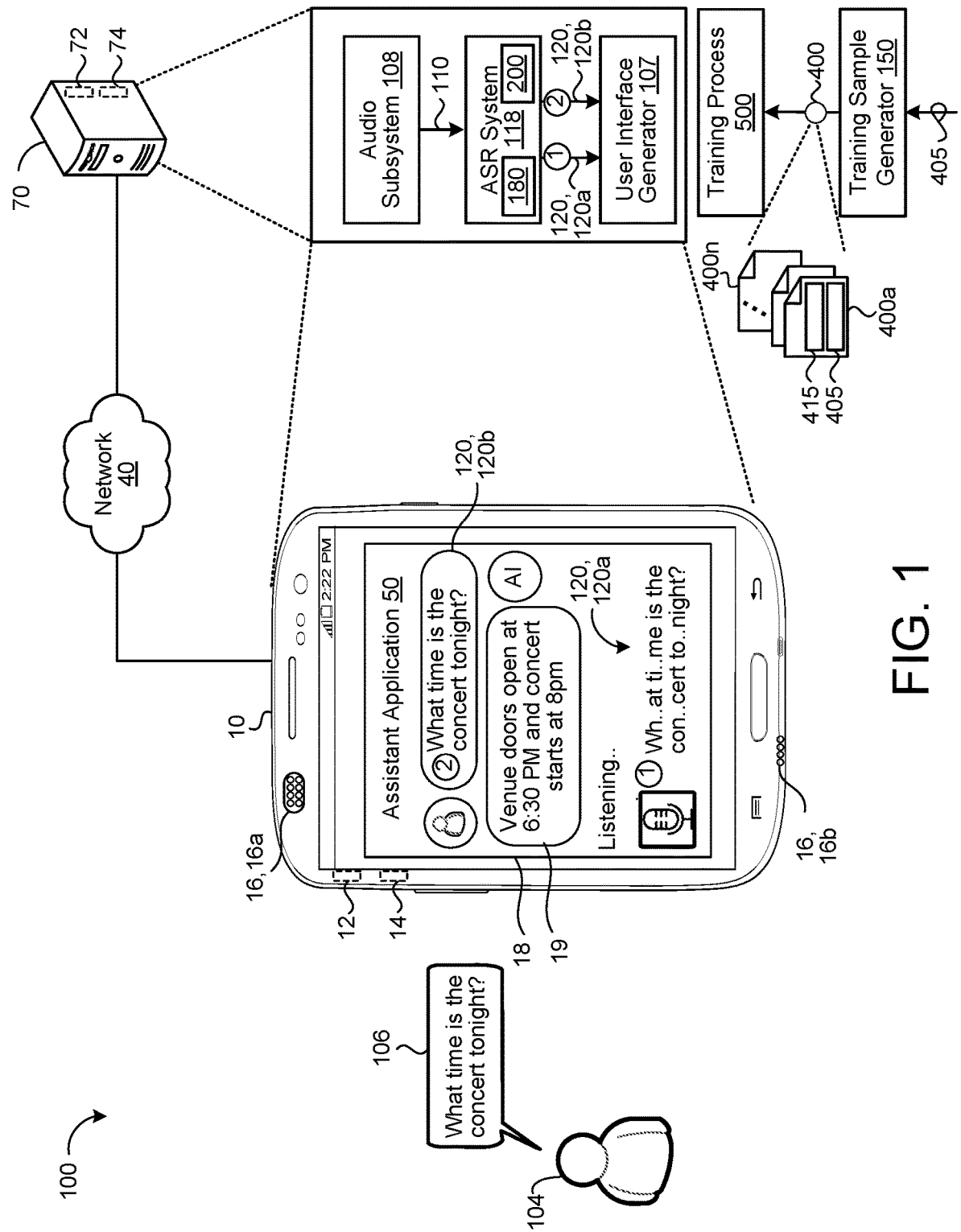
FIG. 1 is a schematic view of an example speech environment using a recurrent neural network-transducer (RNN-T) model for transcribing speech.

Many voice interaction applications, such as telephony applications, voice-activated digital assistants and dialog systems, use automatic speech recognition (ASR) systems. ASR on telephony speech is an important problem with many real-world applications like medical conversations and call centers. However, for such applications and uses, ASR systems need to accurately recognize long-form utterances. Long-form utterances include, for example, utterances that are tens of seconds long, utterances that contain multiple speech segments, etc. Long-form speech recognition remains a challenging ASR task because of its long and conversational nature, the presence of non-speech signals in audio data, and a noisy channel, to name some. Conventional ASR systems perform poorly for long-form tasks, like telephony conversation audio, because they are trained using training data representing short utterances. While conventional ASR systems have achieved state-of-the-art performance on many large-scale benchmarks, the datasets associated with these benchmarks often represent short utterances having good acoustic conditions and high speech quality. Thus, when conventional ASR systems perform ASR on long-form tasks such as telephony speech, the long-form and noisy acoustic conditions can be a big challenge for an ASR model's generalization capability and robustness.

Implementations disclosed herein are directed towards training ASR models on training data that includes long-form training utterances. ASR models trained as disclosed herein are able to, during inference, transcribe long-form speech without having to first segment incoming long-form speech into short segments. Segmenting long-form speech can cause the loss of useful contextual information and introduce transcription errors due to imperfect segmentation. While special handling can reduce the problems associated with segmentation, special handling undesirably increases the complexity and latency of an ASR model. ASR models trained as disclosed herein are able to leverage, during inference, the contextual information present in long-form utterances and eliminate the need for segmentation, without increasing the complexity of the ASR system or introducing additional latency. Example training samples include long-form utterances taken from long audio recordings of telephone calls that are paired with corresponding ground-truth transcriptions. In some examples, long-form training utterances include various combinations of consecutive raw transcribed speech segments of an audio recording that represent respective different segmentations of the audio recording. In some examples, the non-speech segments between speech segments are retained in the training samples.

Implementations disclosed herein are directed toward a method for training a speech recognition model on a set of training samples to teach the speech recognition model to learn to recognize long-form speech. Each training sample in the set of training samples includes a corresponding sequence of speech segments corresponding to a training utterance and a corresponding sequence of ground-truth transcriptions for the sequence of speech segments, wherein each ground-truth transcription in the corresponding sequence of ground-truth transcriptions includes a start time and an end time of a corresponding speech segment. For each training sample in the set of training samples, the method includes processing, using the speech recognition model, the corresponding sequence of speech segments to obtain one or more speech recognition hypotheses for the training utterance, and for each speech recognition hypothesis obtained for the training utterance, identifying a respective number of word errors relative to the corresponding sequence of ground-truth transcriptions. The method further includes training the speech recognition model to minimize word error rate based on the respective number of word errors identified for each speech recognition hypothesis obtained for the training utterance.

FIG. 1 is a schematic view of an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implementing a recurrent neural network-transducer (RNN-T) model 200 and an optional rescorer 180 resides on the user device 10 of the user 104 and/or on a remote computing device 70 (e.g., one or more remote servers of a distributed system executing in a cloud-computing environment) in communication with the user device 10 via a network 40. The user device 10 and/or the remote computing device 70 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the RNN-T model 200 receives, as input, the audio data 110 corresponding to the utterance 106, and generates/predicts, as output, a corresponding transcription 120 (e.g., recognition result/hypothesis) of the utterance 106. In the example shown, the RNN-T model 200 may perform streaming speech recognition to produce an initial speech recognition result 120, 120a and the rescorer 180 may update (i.e., rescore) the initial speech recognition result 120a to produce a final speech recognition result 120, 120b. The server 70 includes data processing hardware 72, and memory hardware 74 in communication with the data processing hardware 72. The memory hardware 74 stores instructions that, when executed by the data processing hardware 72, cause the data processing hardware 72 to perform one or more operations, such as those disclosed herein.

The user device 10 and/or the remote computing device 70 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition result 120b during time 2. In some configurations, the transcription 120 output from the ASR system 118 is processed, e.g., by a natural language processing/understanding (NLP/NLU) module executing on the user device 10 or the remote computing device 70, to execute a user command/query specified by the utterance 106. Additionally or alternatively, a text-to-speech system (not shown) (e.g., executing on any combination of the user device 10 or the remote computing device 70) may convert the transcription into synthesized speech for audible output by the user device 10 and/or another device.

In the example shown, the user 104 interacts with a program or application 50 (e.g., a digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the RNN-T model 200, while receiving the acoustic frames 110 corresponding to the utterance 106 as the user 104 speaks, encodes the acoustic frames 110 and then decodes the encoded acoustic frames 110 into the initial speech recognition results 120a. During time 1, the user interface generator 107 presents, via the digital assistant interface 18, a representation of the initial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition result 120b of the utterance 106 to the user 104 of the user device 10 rescored by the rescorer 180. In some implementations, the user interface generator 107 replaces the representation of the initial speech recognition results 120a presented at time 1 with the representation of the final speech recognition result 120b presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition result 120a at an earlier time than the final speech recognition result 120b. For instance, because the final speech recognition result 120b is presumed to be more accurate than the initial speech recognition results 120a, the user interface generator 107 will ultimately display the final speech recognition result 120b as the transcription 120 to fix any terms that may have been misrecognized in the initial speech recognition results 120a. In this example, the streaming initial speech recognition results 120a output by the RNN-T model 200 are displayed on the screen of the user device 10 at time 1 are associated with low latency and provide responsiveness to the user 104 that his/her query is being processed, while the final speech recognition result 120b output by the rescorer 180 and displayed on the screen at time 2 leverages an additional speech recognition model and/or a language model to improve the speech recognition quality in terms of accuracy, but at increased latency. However, because the initial speech recognition results 120a are displayed as the user speaks the utterance 106, the higher latency associated with producing, and ultimately displaying the final recognition result is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition results 120a and/or the final speech recognition result 120b) and determining whether the written language prompts any action. In this example, the digital assistant application 50 uses NLP/NLU to recognize that the question from the user 104 regards the user's schedule and more particularly a concert on the user's schedule. By recognizing these details with NLP/NLU, the automated assistant returns a response 19 to the user's query where the response 19 states, "Venue doors open at 7:30 PM and concert starts at 9 pm." In some configurations, NLP/NLU occurs on a remote server 70 in communication with the data processing hardware 12 of the user device 10.

Figure 2:
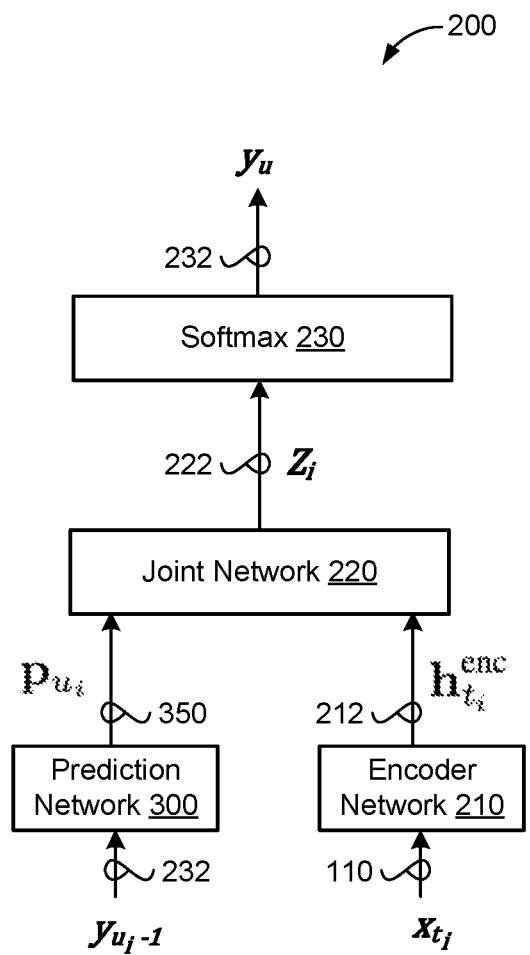
FIG. 2 is a schematic view of an example RNN-T model architecture.

FIG. 2 is a schematic view of an example recurrent neural network—transducer model 200 (i.e., RNN-T model 200) that is trained using long-form training utterances to improve, during inference, speech recognition for long-form utterances. The RNN-T model 200 provides a small computational footprint and utilizes less memory requirements than conventional ASR architectures, making the RNN-T model 200 suitable for performing speech recognition entirely on the user device 10 (e.g., no communication with a remote server is required).

As shown, the RNN-T model 200 includes an encoder network 210, a prediction network 300, a joint network 220, and a final softmax layer 230. The prediction and joint networks 300, 220 may collectively provide an RNN-T decoder. The encoder network 210, which is roughly analogous to an acoustic model (AM) in a traditional ASR system, includes a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation 212. This higher-order feature representation 212 is denoted as $h_1^{enc}, h_T^{enc}$.

Similarly, the prediction network 300 is also an LSTM network, which, like a language model (LM), processes the sequence of non-blank symbols 232 output by the final softmax layer 230 so far, $y_0, y_{ui-1}$, into a dense or hidden representation $p_{u_i}$ 350. Described in greater detail below, the representation $p_{u_i}$ 350 includes a single embedding vector. Notably, the sequence of non-blank symbols 232 received at the prediction network 300 capture linguistic dependencies between non-blank symbols 232 predicted during the previous time steps so far to assist the joint network 220 in predicting the probability of a next output symbol or blank symbol during the current time step. As described in greater detail below, to contribute to techniques for reducing the size of the prediction network 300 without sacrificing accuracy/performance of the RNN-T model 200, the prediction network 300 may receive a limited-history sequence of non-blank symbols 232 $y_{ui-n}, \ldots, y_{ui-1}$ that is limited to the N previous non-blank symbols 232 output by the final softmax layer 230.

The joint network 300 combines the higher-order feature representation $h_{t_i}^{enc}$ 212 produced by the encoder network 210 and the representation $p_{u_i}$ 350 (i.e., single embedding vector 350) produced by the prediction network 300. The joint network 220 predicts a distribution $Z_i = P(y_i | x_{t_i}, y_0, \ldots, y_{ui-1})$ 222 over the next output symbol. Stated differently, the joint network 220 generates, at each time step, a probability distribution 222 over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 220 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 220 can include a posterior probability value for each of the different output labels. Thus, if there are 100 different output labels representing different graphemes or other symbols, the output $Z_i$ 232 of the joint network 220 can include 100 different probability values, one for each output label. The probability distribution can then be used to select and assign scores to candidate orthographic elements (e.g., graphemes, wordpieces, and/or words) in a beam search process (e.g., by the softmax layer 230) for determining the transcription 120.

The final softmax layer 230 receives the probability distribution $Z_i$ 232 for the final speech recognition result 120b and selects the output label/symbol with the highest probability to produce the transcription. The final softmax layer 230 may employ any technique to select the output label/symbol with the highest probability in the distribution $Z_i$ 232. In this manner, the RNN-T model 200 does not make a conditional independence assumption, rather the prediction of each symbol $y_u$ 232 is conditioned not only on the acoustics but also on the sequence of labels 232 $y_{ui-n}, \ldots, y_{ui-1}$ output so far. The RNN-T model 200 does assume an output symbol 232 is independent of future acoustic frames 110, which allows the RNN-T model to be employed in a streaming fashion.

The final speech recognition result 120b is presumed to be more accurate than the initial speech recognition result 120a because the RNN-T model 200 determines the initial speech recognition results 120a in a streaming fashion and the final speech recognition results 120b using the prior non-blank symbols from the initial speech recognition result 120a. That is, the final speech recognition results 120b take into account the prior non-blank symbols and, thus, are presumed more accurate because the initial speech recognition results 120a do not take into account any prior non-blank symbols. Moreover, the rescorer 180 (FIG. 1) may update the initial speech recognition result 120a with the final speech recognition result 120b to provide the transcription via the user interface generator 170 to the user 104.

In some examples, the encoder network 210 of the RNN-T model 200 includes eight 2,048-dimensional LSTM layers, each followed by a 740-dimensional projection layer. In other implementations, the encoder network 210 includes a plurality of multi-headed attention layers. For instance, the plurality of multi-headed attention layers may include a network of conformer or transformer layers. The prediction network 220 may have two 2,048-dimensional LSTM layers, each of which is also followed by 740-dimensional projection layer as well as an embedding layer of 128 units. Finally, the joint network 220 may also have 740 hidden units. The softmax layer 230 may be composed of a unified word piece or grapheme set that is generated using all unique word pieces or graphemes in training data. When the output symbols/labels include wordpieces, the set of output symbols/labels may include 4,096 different word pieces. When the output symbols/labels include graphemes, the set of output symbols/labels may include less than 100 different graphemes.

Figure 3:
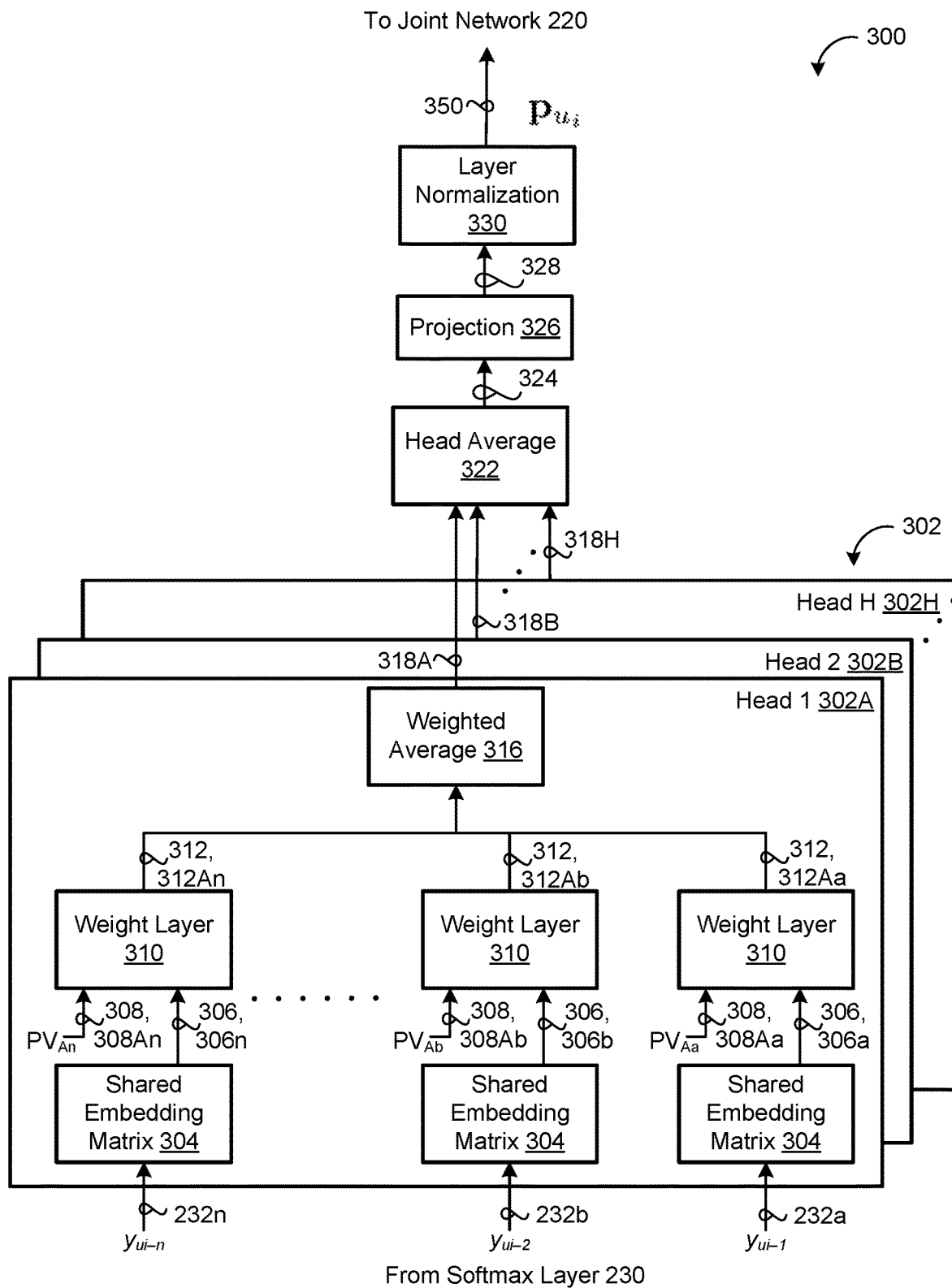
FIG. 3 is a schematic view of an example tied and reduced prediction network of the RNN-T model architecture of FIG. 2.

FIG. 3 is a schematic view of an example prediction network 300 for the RNN-T model 200. The prediction network 300 receives, as input, a sequence of non-blank symbols 232a-n $y_{ui-n}, \ldots, y_{ui-1}$ that is limited to the N previous non-blank symbols 232a-n output by the final softmax layer 230. In some examples, N is equal to two. In other examples, N is equal to five, however, the disclosure is non-limiting and N may equal any integer. The sequence of non-blank symbols 232a-n indicates an initial speech recognition result 120a (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{Nxd_e}$) for each non-blank symbol among the sequence of non-blank symbols 232a-n $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., P $\in \mathbb{R}^{HxNxd_e}$) to each corresponding non-blank symbol in the sequence of non-blank symbols 232232a-n $y_{ui-n}, \ldots, y_{ui-1}$. The respective position vector PV 308 assigned to each non-blank symbol indicates a position in the history of the sequence of non-blank symbols (e.g., the N previous non-blank symbols 232232a-n output by the final softmax layer 230). For instance, the first position vector $PV_{Aa}$ is assigned to a most recent position in the history, while the last position vector $PV_{An}$ is assigned to a last position in the history of the N previous non-blank symbols output by the final softmax layer 230. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols 232232a-n $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $308_{Ba-Bn}, \ldots$, and the $H^{th}$ head 302 H defines another different row of position vectors $PV_{Ha-Hn}$ $308_{Ha-Hn}$.

For each non-blank symbol in the sequence of non-blank symbols 232232a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa—An are not concatenated, but instead, averaged by a weighted average module 316 to generate, as output from the first head 302A, a weighted average 318A of the weighted embeddings 312Aa—An represented by:

$$\text{Prediction } (X, P) = \frac{1}{H*N} \sum_{h,n} X_n * \sum_{e} (X_{n,e} * P_{h,n,e}) \qquad (1)$$

In Equation (1), h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa—Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

In some implementations, to further reduce the size of the RNN-T decoder, i.e., the prediction network 300 and the joint network 220, parameter tying between the prediction network 300 and the joint network 220 is applied. Specifically, for a vocabulary size |V| and an embedding dimension $d_e$, the shared embedding matrix 304 at the prediction network is $E \in \mathbb{R}^{|V| \times d_e}$. Meanwhile, a last hidden layer includes a dimension size $d_h$ at the joint network 220, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 220 includes a weight matrix $[d_h, |V|]$. By having the prediction network 300 to tie the size of the embedding dimension $d_e$ to the dimensionality $d_h$ of the last hidden layer of the joint network 220, the feed-forward projection weights of the joint network 220 and the shared embedding matrix 304 of the prediction network 300 can share their weights for all non-blank symbols via a simple transpose transformation. Since the two matrices share all their values, the RNN-T decoder only needs to store the values once on memory, instead of storing two individual matrices. By setting the size of the embedding dimension $d_e$ equal to the size of the hidden layer dimension $d_h$, the RNN-decoder reduces a number of parameters equal to the product of the embedding dimension $d_e$ and the vocabulary size |V|. This weight tying corresponds to a regularization technique.

Referring back to FIG. 1, a training process 500 trains the RNN-T model 200 on a set of training samples 400, 400232a-n. In some examples, a training sample generator 150 generates the training samples 400 by concatenating groups of sequential speech segments 405 each paired with a corresponding ground-truth transcription 415. Each training sample 400 corresponds to a training utterance containing a corresponding sequence of speech segments x 405 and a corresponding sequence of ground-truth transcriptions 415. Each speech segment 405 may correspond to speech captured in streaming audio by an audio capture device and stored with a corresponding transcription of the speech segment. While all the speech segments in a concatenated sequence that form a corresponding training sample 400 may be captured by a same audio capture device and/or spoken by a same speaker, the present disclosure is not so limited. For instance, at least one speech segment in a concatenated sequence forming a corresponding training sample 400 may be captured by a different audio capture device than the other speech segments in the training sample 400 and/or spoken by a different speaker than speaker(s) that spoke the other speech segments in the training sample 400.

In some examples, the training sample generator 150 is further configured to vary acoustic diversity among the corresponding sequences of speech segments 405 in the training samples 400 used to train the RNN-T model 200. For instance, the training sample generator 150 may apply data augmentation techniques that include at least one of adding/injecting noise, adding reverberation, and/or manipulating timing (e.g., stretching) of the speech segments x 405. Optionally, the data augmentation techniques may include time warping. Another data augmentation technique includes using multi-style training (MTR) to inject a variety of environmental noises to the speech segments x 405.

Figure 4:
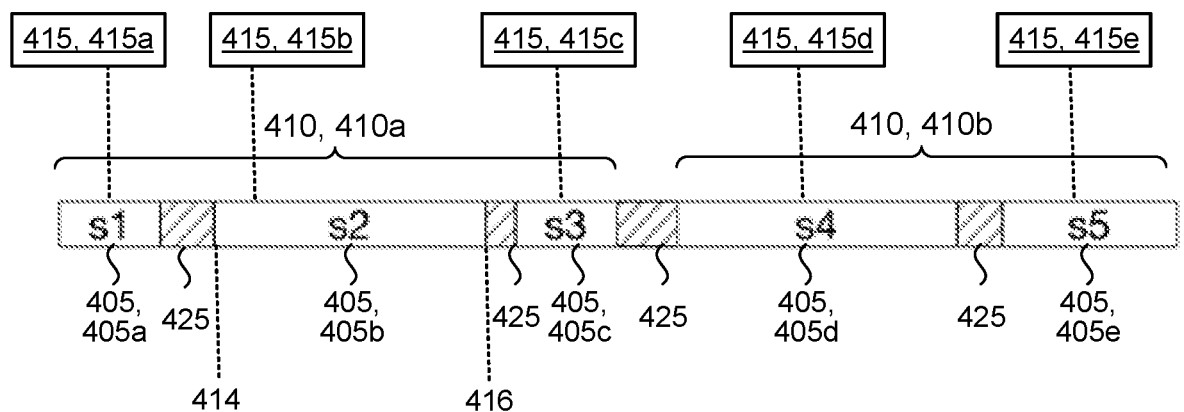
FIG. 4 illustrates example long-form training utterances.

FIG. 4 illustrates example training samples 400, 400a-b that each include a corresponding sequence of raw speech segments x 405a-c, 405d-e. As shown, the adjacent raw speech segments 405 may be separated by a non-speech segment 425. While the example shown depicts the first training sample 400a including a sequence of three (3) speech segments 405a-c and the second training sample 400b including a sequence of (2) speech segments 405d-e, training samples can include tens of speech segments 405. Each raw speech segment 405 is associated with a respective ground-truth transcription y* 415. Accordingly, each ground-truth transcription y* 415, 415a-e includes a start time 414 and an end time 416 of a corresponding speech segment 405. In some examples, an average duration of the speech segments 420 is at least six seconds. The training sample generator 150 generates each training sample 410 associated with a training utterance by merging, concatenating, or otherwise combining, various combinations of consecutive raw speech segments 405 that represent respective different segmentations of speech forming each training sample 400. Notably, the training sample generator 150 can generate training samples 400 associated with training utterances of different lengths (e.g., raw, short, medium, and long) by selecting how many raw speech segments 405 are joined together (e.g., 1, 2, . . . , N) to form the corresponding training utterance. One speech segment 405 may be included in more than one of the training samples 400. In some examples, the training sample generator 150 uses the start and end times of the speech segments 405 to determine which and how many speech segments 405 to combine/concatenate to form the corresponding training utterances of particular lengths.

Referring back to FIG. 1, the training process 500 trains the RNN-T model 200 on a speech recognition performance task. In some examples, the training process 500 trains the RNN-T model 200 to reduce a log loss metric $\mathcal{L}_{ll}$. For a particular training sample 400, an example log loss metric/term is the negative of the log of the probability $Z_i$ 222 for the corresponding sequence of ground-truth transcriptions y* 415 conditioned on the corresponding sequence of speech segments 405. By reducing this log loss metric $\mathcal{L}_{ll}$, the training process 500 trains the RNN-T model 200 to increase the probability $Z_i$ 222 for the sequence of ground truth transcriptions y* 415 conditioned on the input acoustic features, i.e., the sequence of speech segments 405. The negative log probability $\mathcal{L}_{ll}$ may be expressed as follows.

$$\mathcal{L}_{ll} = -\log Pr(y^*|x) \quad (2)$$

Additionally or alternatively, the training process 500 may train the RNN-T model 200 to reduce a minimum word error rate (MWER) loss $\mathcal{L}_{mwer}$. When minimizing MWER, the training process 500 trains the RNN-T model 200 to boost a respective probability/confidence for each of one or more speech recognition hypotheses 522 (FIGS. 5 and 6) (e.g., an N-best list of hypotheses) for the training utterance that have fewer word errors and reduce the respective probability/confidence for each of the one or more speech recognition hypotheses that are worse on average. For example, the training process 500 can compute, for a training sample 400, the number of word errors l(y, y*) for each speech recognition hypothesis 522 y output by the RNN-T model for the corresponding sequence of speech segments 405 of the training sample 400 relative to the corresponding sequence of ground-truth transcriptions y*415. The training process 500 then computes an average $\hat{\ell}$ of the numbers of word errors l(y, y*). In some examples, when computing the average $\hat{\ell}$ of the numbers of word errors l(y, y*), the training process 500 only considers the hypotheses in a list of the N-best hypotheses based on the probabilities $Z_i$ 222 output by the RNN-T model 200. Accordingly, the training process 500 may minimize MWER loss to boost the probabilities of the hypotheses whose number of word errors l(y, y*) are less than the average $\hat{\ell}$ and reduce the probabilities of the hypotheses whose number of word errors l(y, y*) are greater than the average $\hat{\ell}$. By using MWER loss, the training process 500 performs discriminative training amongst the hypotheses. By contrast, using log loss $\mathcal{L}_{ll}$ alone, the training process 500 only increases the probability $Z_i$ 222 of the ground-truth transcriptions y*420. An example MWER loss $\mathcal{L}_{mwer}$ can be expressed as follows.

$$\mathcal{L}_{mwer} = \sum_y Pr(\mathcal{Y}|x)\ell(y, y^*) \quad (3)$$

$$\approx \frac{1}{N} \sum_{y_i \in Beam\text{-}N(x)} \hat{P}(y_i)[\ell(y_i, y^*) - \hat{\ell}]$$

where $$\hat{P}(\mathcal{Y}_i) = \frac{Pr(y_i|x)}{\sum_{y_i \in Beam\text{-}N(x)} Pr(y_i|x)} \quad (4)$$

is the renormalized probability, and $$\hat{\ell} = \Sigma \, \mathcal{Y}_{i \in Beam-N(x)} \hat{P}(\ell_i) \mathcal{Y}(\mathcal{Y}_i, \mathcal{Y}^*) \quad (5)$$

is the average number of word errors $\hat{\ell}$ in the N-best hypotheses of a beam search, which is denoted in EQN (5) as "Beam–N(x)".

In some implementations, the training process 500a trains the RNN-T model 200 to reduce both log loss $\mathcal{L}_{ll}$ and MWER loss $\mathcal{L}_{mwer}$. For example, the training process 500a may train the RNN-T model 200 to reduce a loss $\mathcal{L}_{combo}$ that is a combination of log loss $\mathcal{L}_{ll}$ 537 and MWER loss $\mathcal{L}_m$ 535. An example combination loss $\mathcal{L}_{combo}$ is an interpolation of log loss $\mathcal{L}_{ll}$ and MWER loss $\mathcal{L}_{mwer}$, which can be expressed as $$\mathcal{L}_{combo} = \mathcal{L}_{mwer} + \lambda \mathcal{L}_{ll} \quad (6)$$

where λ is a parameter selected by the training process 500 to control the relative contributions of log loss $\mathcal{L}_{ll}$ and MWER loss $\mathcal{L}_{mwer}$ to the training of the RNN-T model 200. Other combinations of log loss $\mathcal{L}_{ll}$ and MWER loss $\mathcal{L}_{mwer}$ may be used.

While training based on MWER loss $\mathcal{L}_{mwer}$ 535 yields good speech recognition performance for long-form utterances, training based on MWER loss $\mathcal{L}_{mwer}$ may be computationally expensive. Moreover, the advantages of using MWER loss $\mathcal{L}_{mwer}$ during training compared to using log loss $\mathcal{L}_{ll}$ diminishes as the lengths of the training utterances 410 increase. Therefore, alternatively, the training process 500 can train the RNN-T model 200 using a two-stage training process as described in greater detail below with reference to FIG. 6. In a first training stage, the training process 500 trains the RNN-T model 200 using log loss $\mathcal{L}_{ll}$ for longer long-form training utterances 410 to reduce training complexity. In a second training stage that starts with the best performing RNN-T model 200 from the first training stage, the training process 500 fine-tunes the RNN-T model 200 based on MWER loss $\mathcal{L}_{ll}$ for shorter long-form training utterances 410 (e.g., raw utterances containing only a single speech segment 420) to obtain a WER on par with training based on only MWER loss $\mathcal{L}_{mwer}$ in a single stage training process. In some examples, the training process 500 updates parameters of the encoder network 210 and the decoder network 300 during the first training stage, and does not update parameters of the encoder network 210 during the second training stage.

Figure 5:
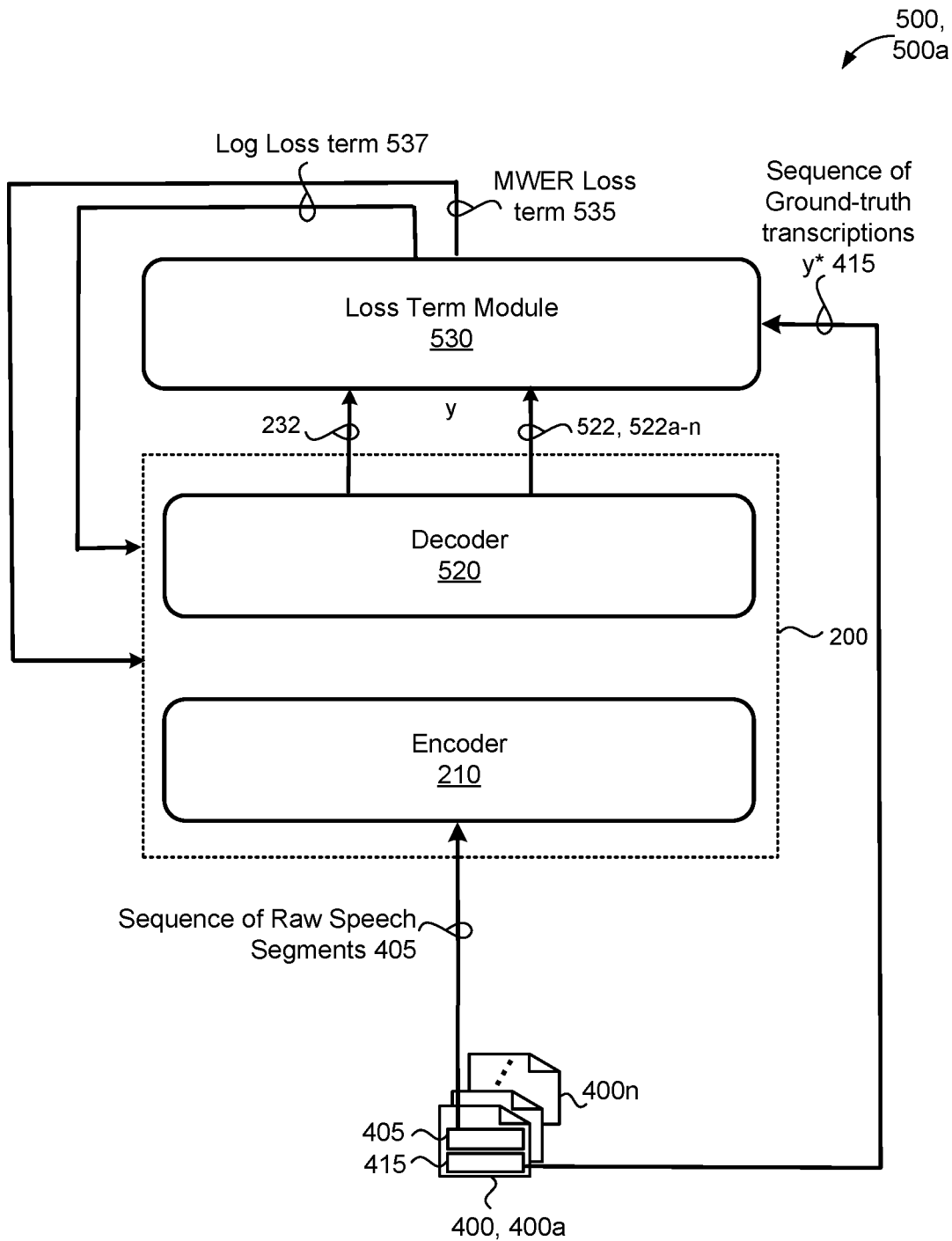
FIG. 5 is a schematic view of an example training process for training a speech recognition model using long-form training utterances.

FIG. 5 is a schematic view of an example training process 500, 500a for training the speech recognition model 200 to minimize word error rate (WER) on a set of training samples 400 associated with long-form training utterances. The speech recognition model 200 may include the RNN-T model architecture of FIG. 2 that includes the encoder 210 and a decoder 520, wherein the decoder 520 collectively includes the prediction and joint networks 300, 220. The training process 500a may execute on the remote system 70 (i.e., on the data processing hardware 72) or on the user device 10 (i.e., on the data processing hardware 12). For each training sample 400 in the set of trainings samples 400 generated by the training sample generator 150 (FIG. 1), the training process 500a processes, using the RNN-T model 200, the corresponding sequence of speech segments 405 to obtain one or more speech recognition hypotheses 522, 522232a-n for the training utterance.

Thereafter, for each training sample 400, a loss term module 530 receives the one or more speech recognition hypotheses 522 output by the RNN-T model 200 for the corresponding training utterance, and identifies a respective number of word errors for each speech recognition hypothesis 522 relative to the corresponding sequence of ground-truth transcriptions 415. Here, the loss term module 530 may determine (i.e., using EQN (5)) a MWER loss term 535 that represents an average number of word errors in the one or more speech recognition hypotheses 522. In some examples, the loss term module 300 receives an N-best list of speech recognition hypotheses 522 corresponding to the N-highest ranking speech recognition hypotheses 522 of a beam search for the corresponding training utterance. Thus, the loss term module 530 may apply EQN (5) to determine/compute a MWER loss term 535 indicating the average number of word errors in the N-best hypotheses 522 of the beam search. Based on the MWER loss term 535 output by the loss term module 530 for each training sample 400, the training process 500a trains the RNN-T model 200 to minimize the MWER based on the respective number of word errors identified for each speech recognition hypothesis obtained for the corresponding training utterance.

In some implementations, in addition to or in lieu of computing the MWER loss term 535 indicating the average number of word errors in the N-best hypotheses 522 output by the RNN-T model 200 for each training sample 400, the training process 500a computes a log loss term 537 (i.e., using EQN (2)) indicating the negative of the log of the probabilities 222 for the corresponding sequence of ground-truth transcriptions y* 415 for each training sample 400. Here, the training process 500 may derive the probability for any (Pr(y|x)) by marginalizing all possible alignments using a forward backward algorithm.

Figure 6:
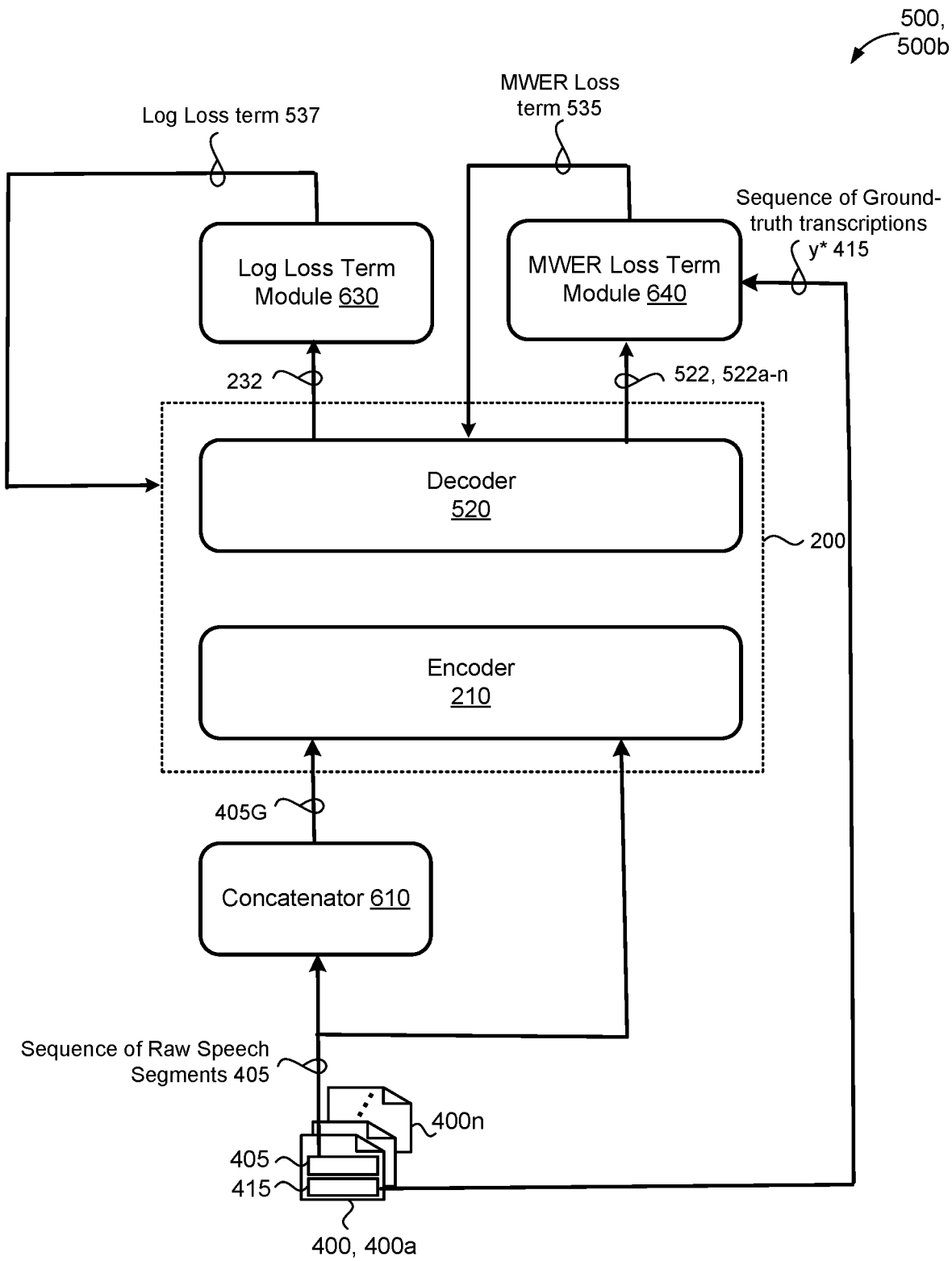
FIG. 6 is a schematic view of an example two-stage process module for training a speech recognition model using long-form training utterances.

FIG. 6 is a schematic view of an example two-stage training process 500, 500b for training the RNN-T model 200. The training process 500b obtains a set of training samples 400 each including a corresponding sequence of raw speech segments 405 and a corresponding sequence of ground-truth transcriptions 415 for the sequence of raw speech segments 405. Each ground-truth transcription in the corresponding sequence of ground-truth transcriptions 415 may include a start time 414 and an end time 416 of a corresponding raw speech segment 405.

During a first stage of the two stage training process 500b, a concatenator 610 concatenates two or more groups of consecutive raw speech segments 405 from the sequence of raw speech segments 405 to form a respective long training utterance for each concatenated group 405G of consecutive raw speech segments 405. Here, each concatenated group 405G of consecutive raw speech segments 405 is paired with a corresponding group of sequences of ground-truth transcriptions 415. For each respective long training utterance, the first stage of the two stage training process processes, using the speech recognition model 200, the concatenated group 405G of consecutive raw speech segments to predict a speech recognition hypothesis 232 (represented by the probabilities 222 output from the decoder 520) for the respective long training utterance. Thereafter, the log loss term module 630 determines (i.e., using EQN (2)) a log loss term $\mathcal{L}_{\ell\ell_{lt}}$ 537 based on the predicted speech recognition hypotheses 232 for the respective long training utterance and the corresponding group of ground-truth transcriptions y* 415. The first stage of the two stage training process 500b trains the speech recognition model 200 using the log loss terms 537 to initialize the speech recognition model 200.

During the second stage, for each training sample 400 in the set of trainings samples 400 generated by the training sample generator 150 (FIG. 1), the training process 500b processes, using the RNN-T model 200 initialized by the first training stage, the corresponding sequence of speech segments 405 to obtain one or more speech recognition hypotheses 522, 522232a-n. Thereafter, a MWER loss term module 640 identifies a respective number of word errors for each speech recognition hypothesis 522 relative to the corresponding sequence of ground-truth transcriptions 415. Here, the MWER loss term module 640 may determine (i.e., using EQN (5)) a MWER loss term 535 that represents an average number of word errors in the one or more speech recognition hypotheses 522. In some examples, the MWER loss term module 640 receives an N-best list of speech recognition hypotheses 522 corresponding to the N-highest ranking speech recognition hypotheses 522 of a beam search for the corresponding training utterance. Thus, the MWER loss term module 640 may apply EQN (5) to determine/compute a MWER loss term 535 indicating the average number of word errors in the N-best hypotheses 522 of the beam search. Based on the MWER loss term 535 output by the MWER loss term module 640 for each training sample 400, the training process 500b trains the RNN-T model 200 to minimize the MWER based on the respective number of word errors identified for each speech recognition hypothesis obtained for the corresponding training utterance. In some examples, the second training stage of the training process 500b updates parameters the decoder 520 based on the MWER loss terms 535, while holding parameters of the encoder 210 fixed.

Figure 7:
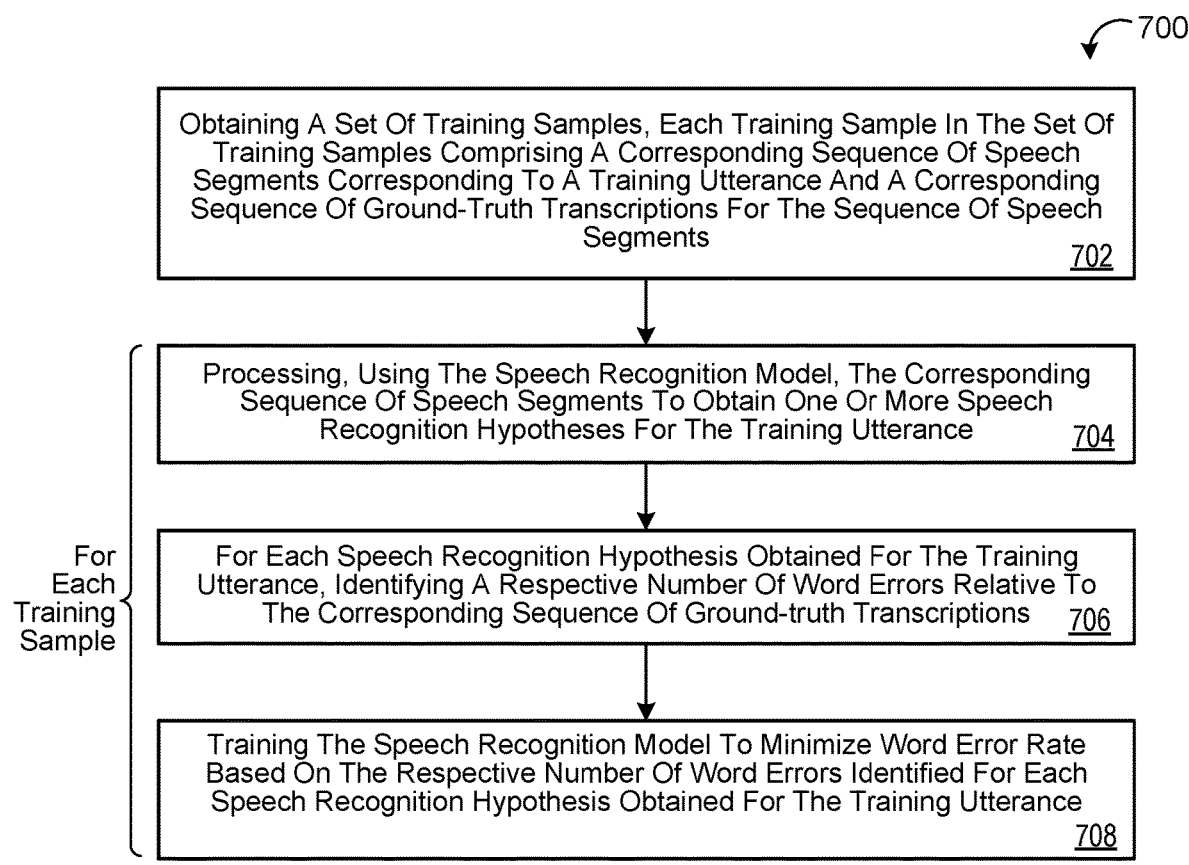
FIG. 7 is a flowchart of another example arrangement of operations for a computer-implemented method of training a speech recognition model using long-form training utterances.

FIG. 7 is a flowchart of an exemplary arrangement of operations for a computer-implemented method 700 for training a speech recognition model 200 (e.g., the RNN-T model 200). At operation 702, the method 700 includes obtaining a set of training samples 400. Each training sample 400 in the set of training samples 400 includes a corresponding sequence of speech segments 405 corresponding to a training utterance, and a corresponding sequence of one or more ground-truth transcriptions y* 415 for respective ones of the sequence of speech segments 405. Each ground-truth transcription y* 415 in the corresponding sequence of one or more ground-truth transcriptions y* 415 includes a start time 414 and an end time 416 of a corresponding speech segment 405.

For each training sample 400 in the set of training samples, the method 700 performs operations 704, 706 and 708. At operation 704, the method 700 includes processing, using the speech recognition model 200, the corresponding sequence of speech segments 405 to obtain one or more speech recognition hypotheses 522 for the training utterance. At operation 706, the method 700 includes, for each speech recognition hypothesis 522 obtained for the training utterance 410, identifying a respective number of word errors $\ell$ (y*, y) relative to the corresponding sequence of one or more ground-truth transcriptions y* 415. At operation 708, the method 700 includes training the speech recognition model 200 to minimize WER based on the respective number of word errors $\ell$ (y*, y) identified for each speech recognition hypothesis 522 obtained for the training utterance 410. For instance, the method 700 may train the model 200 using the MWER loss term 535 computed using EQN 5.

Figure 8:
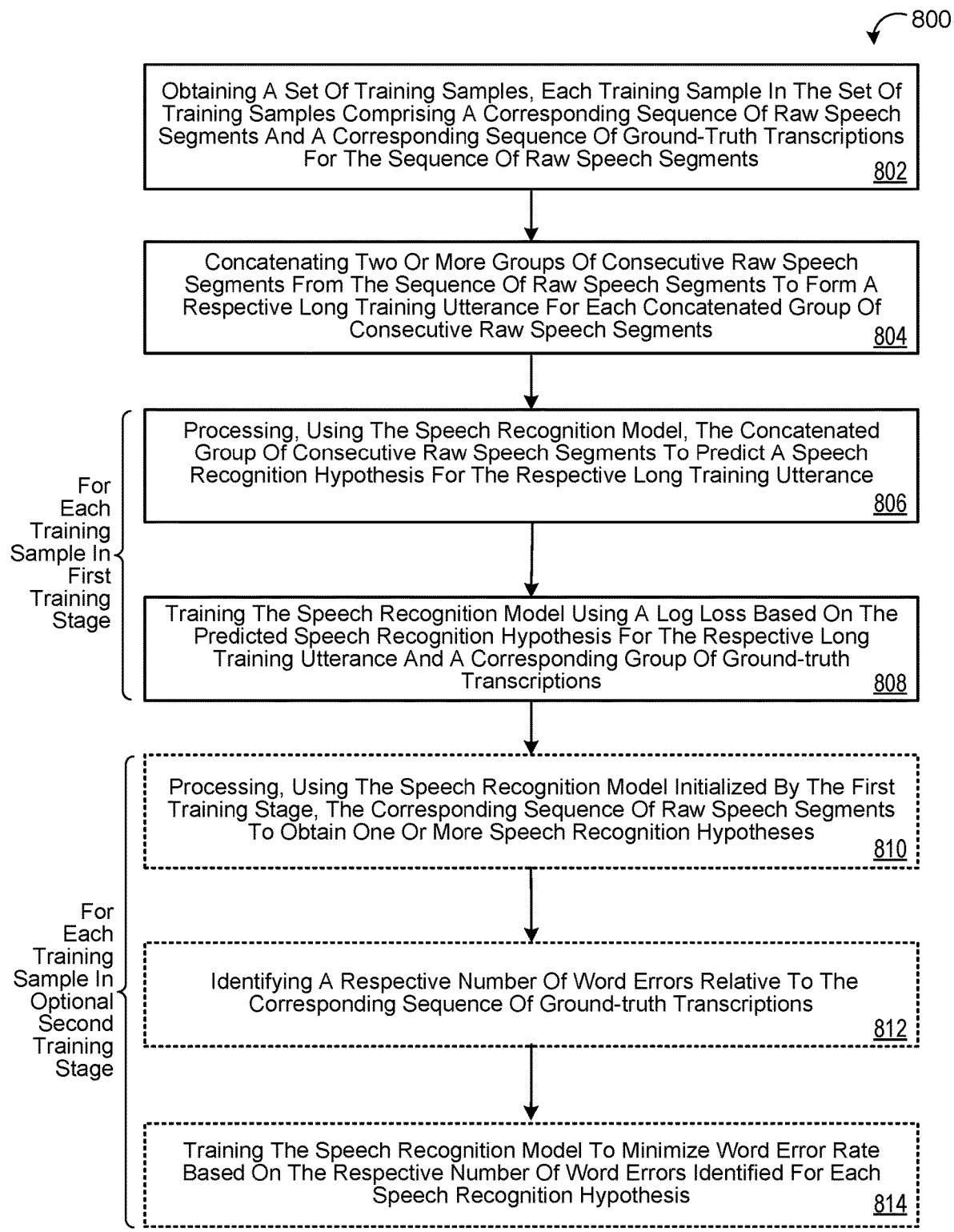
FIG. 8 is a flowchart of another example arrangement of operations for a computer-implemented method of training a speech recognition model for long-form speech recognition.

FIG. 8 is a flowchart of another exemplary arrangement of operations for a computer-implemented method 800 for training a speech recognition model 200 (e.g., the RNN-T model 200) using long training utterances. At operation 802, the method 800 includes obtaining a set of training samples 400. Each training sample 400 in the set of training samples 400 a corresponding sequence of one or more raw speech segments 405 and a corresponding sequence of ground-truth transcriptions y* 415 for the sequence of raw speech segments 405. Each ground-truth transcription y* 415 in the corresponding sequence of ground-truth transcriptions y* 415 includes a start time 414 and an end time 416 of a corresponding raw speech segment.

At operation 804, the method 800 includes concatenating two or more groups of consecutive raw speech segments 405G from the sequence of raw speech segments 405 to form a respective long training utterance for each concatenated group of consecutive raw speech segments 405G.

During a first training stage, for each respective long training utterance, the method 800 performs operations 806 and 808. At operation 806, the method 800 includes processing, using the speech recognition model 200, the concatenated group of consecutive raw speech segments 405G to predict a speech recognition hypothesis 232 for the respective long training utterance 614.

At operation 808, the method 800 includes training the speech recognition model 200 using a log loss $\mathcal{L}_{\ell\ell_{ll}}$ 535 based on the predicted speech recognition hypothesis 232 for the respective long training utterance and a corresponding group of ground-truth transcriptions y*415.

During an optional second training stage, as denoted by the dotted lines, the method 800 optionally performs operations 810, 812 and 814. For each short training sample 400 in a set of short training samples 400, at operation 810, the method 800 includes processing, using the speech recognition model 200 initialized by the first training stage, a corresponding sequence of raw speech segments 405 to obtain one or more speech recognition hypotheses 522 (e.g., an N-best list of hypotheses 522 each corresponding to a respective candidate transcription for the utterance. Then, at operation 812, the method 800 includes, for each speech recognition hypothesis 522, identifying a respective number of word errors $\ell$ (y*, y) relative to the corresponding sequence of ground-truth transcriptions y*415. At operation 814, the method 800 includes training the speech recognition model 200 to minimize word error rate based on the respective number of word errors $\ell$ (y*, y) identified for each speech recognition hypothesis 522.

Figure 9:
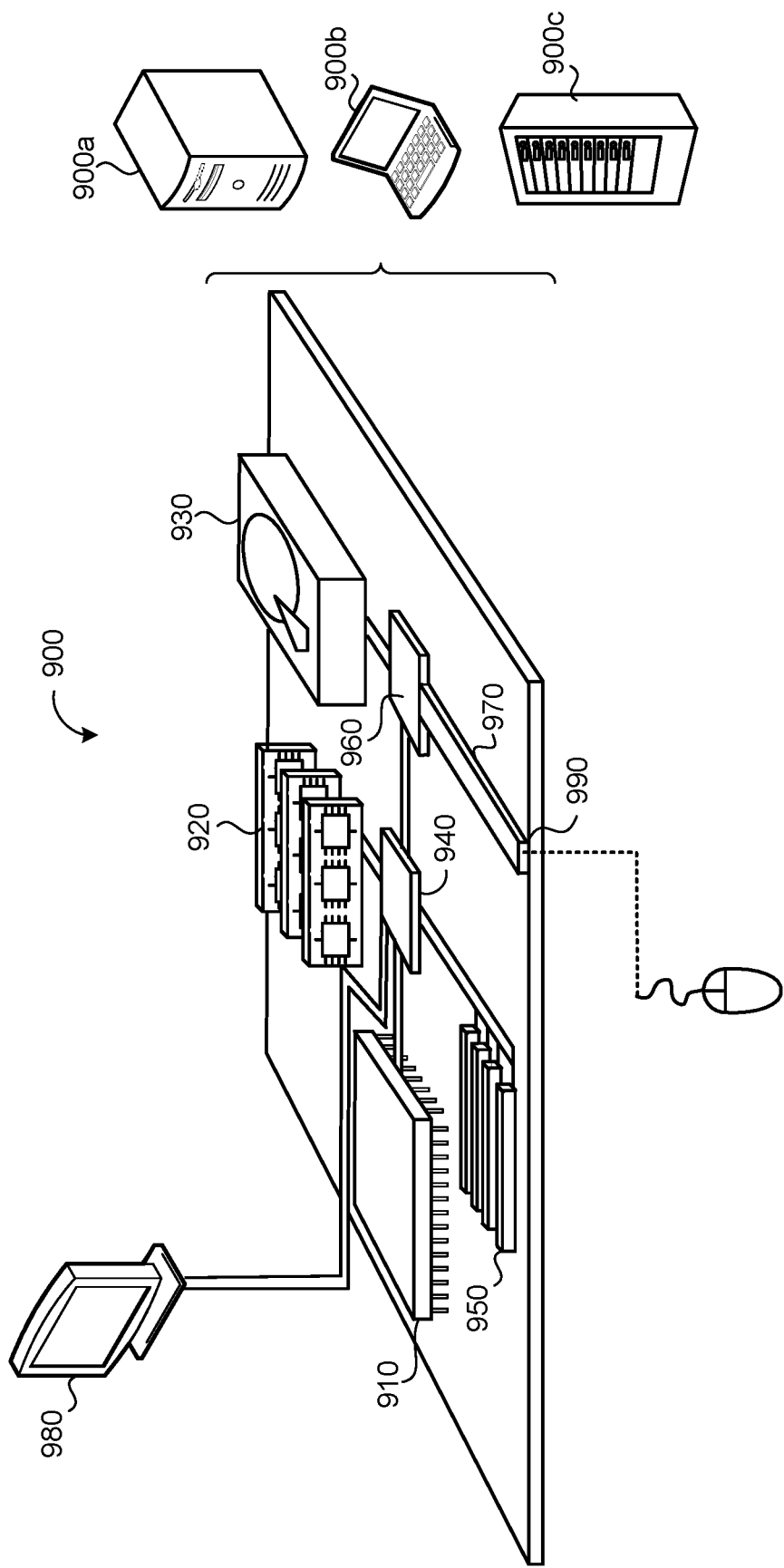
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910 (i.e., data processing hardware) that can be used to implement the data processing hardware 12 and/or 62, memory 920 (i.e., memory hardware) that can be used to implement the memory hardware 14 and/or 64, a storage device 930 (i.e., memory hardware) that can be used to implement the memory hardware 14 and/or 64, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, "or" refers to an inclusive or and not to an exclusive or. For example, "A, B, or C" refers to any combination or subset of A, B, C such as: (1) A alone; (2) B alone; (3) C alone; (4) A with B; (5) A with C; (6) B with C; and (7) A with B and with C. Similarly, the phrase "at least one of A or B" is intended to refer to any combination or subset of A and B such as: (1) at least one A; (2) at least one B; and (3) at least one A and at least one B. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for training a speech recognition model to recognize long-form speech, the computer-implemented method when executed on data processing hardware causes the data processing hardware to perform operations comprising:

obtaining a set of training samples, each training sample in the set of training samples comprising a corresponding sequence of speech segments corresponding to a training utterance and a corresponding sequence of ground-truth transcriptions for the sequence of speech segments, wherein each ground-truth transcription in the corresponding sequence of ground-truth transcriptions comprises a start time and an end time of a corresponding speech segment; and for each training sample in the set of training samples:
  processing, using the speech recognition model, the corresponding sequence of speech segments to obtain an N-best list of speech recognition hypotheses for the training utterance;
  for each speech recognition hypothesis in the N-best list of speech recognition hypotheses, identifying a respective number of word errors relative to the corresponding sequence of ground-truth transcriptions;
  computing an average of the respective number of word errors identified for each speech recognition hypothesis in the N-best list of speech recognition hypotheses; and
  training the speech recognition model to minimize word error rate based on the computed average of the respective number of word errors in the N-best list of speech recognition hypotheses by, for each speech recognition hypothesis in the N-best list of speech recognition hypotheses, one of:
    increasing a probability of the speech recognition hypothesis when the respective number of word errors is less than the computed average; or decreasing the probability of the speech recognition hypothesis when the respective number of word errors is greater than the computed average.

2. The computer-implemented method of claim 1, wherein each training sample in the set of training samples further comprises a respective non-speech segment between each pair of adjacent speech segments in the sequence of speech segments.

3. The computer-implemented method of claim 1, wherein each speech segment in the sequence of speech segments comprises an average duration of at least six seconds.

4. The computer-implemented method of claim 1, wherein the speech recognition model comprises a transducer-based speech recognition model that comprises an encoder network, a prediction network, and a joint network.

5. The computer-implemented method of claim 4, wherein the encoder network comprises a plurality of multi-headed attention layers.

6. The computer-implemented method of claim 4, wherein:
the prediction network is configured to, at each of a plurality of time steps subsequent to an initial time step:
receive, as input, a sequence of non-blank symbols output by a final softmax layer;
for each non-blank symbol in the sequence of non-blank symbols received as input at the corresponding time step:
generate, using a shared embedding matrix, an embedding of the corresponding non-blank symbol;
assign a respective position vector to the corresponding non-blank symbol; and
weight the embedding proportional to a similarity between the embedding and the respective position vector; and
generate, as output, a single embedding vector at the corresponding time step, the single embedding vector based on a weighted average of the weighted embeddings; and
the joint network is configured to, at each of the plurality of time steps subsequent to the initial time step:
receive, as input, the single embedding vector generated as output from the prediction network at the corresponding time step; and
generate a probability distribution over possible speech recognition hypotheses at the corresponding time step.

7. The computer-implemented method of claim 6, wherein the prediction network ties a dimensionality of the shared embedding matrix to a dimensionality of an output layer of the joint network.

8. A system comprising:
data processing hardware; and
memory hardware in communication with the data processing hardware and storing instructions that when executed on the data processing hardware causes the data processing hardware to perform operations comprising:
obtaining a set of training samples, each training sample in the set of training samples comprising a corresponding sequence of speech segments corresponding to a training utterance and a corresponding sequence of ground-truth transcriptions for the sequence of speech segments, wherein each ground-truth transcription in the corresponding sequence of ground-truth transcriptions comprises a start time and an end time of a corresponding speech segment; and
for each training sample in the set of training samples:
processing, using a speech recognition model, the corresponding sequence of speech segments to obtain an N-best list of speech recognition hypotheses for the training utterance;
for each speech recognition hypothesis in the N-best list of speech recognition hypotheses, identifying a respective number of word errors relative to the corresponding sequence of ground-truth transcriptions;
computing an average of the respective number of word errors identified for each speech recognition hypothesis in the N-best list of speech recognition hypotheses; and
training the speech recognition model to minimize word error rate based on the computed average of the respective number of word errors in the N-best list of speech recognition hypotheses by, for each speech recognition hypothesis in the N-best list of speech recognition hypotheses, one of:
increasing a probability of the speech recognition hypothesis when the respective number of word errors is less than the computed average; or
decreasing the probability of the speech recognition hypothesis when the respective number of word errors is greater than the computed average.

9. The system of claim 8, wherein each training sample in the set of training samples further comprises a respective non-speech segment between each pair of adjacent speech segments in the sequence of speech segments.

10. The system of claim 8, wherein each speech segment in the sequence of speech segments comprises an average duration of at least six seconds.

11. The system of claim 8, wherein the speech recognition model comprises a transducer-based speech recognition model that comprises an encoder network, a prediction network, and a joint network.

12. The system of claim 11, wherein the encoder network comprises a plurality of multi-headed attention layers.

13. The system of claim 11, wherein:
the prediction network is configured to, at each of a plurality of time steps subsequent to an initial time step:
receive, as input, a sequence of non-blank symbols output by a final softmax layer;
for each non-blank symbol in the sequence of non-blank symbols received as input at the corresponding time step:
generate, using a shared embedding matrix, an embedding of the corresponding non-blank symbol;
assign a respective position vector to the corresponding non-blank symbol; and
weight the embedding proportional to a similarity between the embedding and the respective position vector; and
generate, as output, a single embedding vector at the corresponding time step, the single embedding vector based on a weighted average of the weighted embeddings; and
the joint network is configured to, at each of the plurality of time steps subsequent to the initial time step:

receive, as input, the single embedding vector generated as output from the prediction network at the corresponding time step; and generate a probability distribution over possible speech recognition hypotheses at the corresponding time step.

14. The system of claim 13, wherein the prediction network ties a dimensionality of the shared embedding matrix to a dimensionality of an output layer of the joint network.

\* \* \* \* \*